US012539596B2

(12) United States Patent
Earle et al.

(10) Patent No.: US 12,539,596 B2
(45) Date of Patent: Feb. 3, 2026

(54) HYDRAULIC TOOL STAND

(71) Applicant: SOUTHWORTH-MILTON INC., Milford, MA (US)

(72) Inventors: David Earle, Baldwinsville, NY (US); Steven Earle, Baldwinsville, NY (US); Mark Biron, Northborough, MA (US)

(73) Assignee: Southworth Milton Inc., Milford, MA (US)

( * ) Notice: Subject to any disclaimer, the term of this patent is extended or adjusted under 35 U.S.C. 154(b) by 346 days.

(21) Appl. No.: 18/104,967

(22) Filed: Feb. 2, 2023

(65) Prior Publication Data

US 2024/0131681 A1 Apr. 25, 2024

Related U.S. Application Data

(63) Continuation-in-part of application No. 29/857,412, filed on Oct. 21, 2022, now Pat. No. Des. 1,068,889.

(51) Int. Cl.
*B66F 5/00* (2006.01)
*B25H 3/06* (2006.01)

(52) U.S. Cl.
CPC ..................................... *B25H 3/06* (2013.01)

(58) Field of Classification Search
CPC ...... B66F 5/00; B66F 7/10; B66F 7/08; B66F 7/00; B66F 5/04; B66F 3/04; B66F 3/00
See application file for complete search history.

(56) References Cited

U.S. PATENT DOCUMENTS

| | | | | |
|---|---|---|---|---|
| 2,439,854 | A * | 4/1948 | Lipski | E04G 25/061 280/402 |
| 2,529,892 | A | 11/1950 | Adams | |
| 3,410,176 | A | 11/1968 | Christop | |
| 3,920,212 | A * | 11/1975 | Westwood | B66F 13/00 248/352 |
| D376,161 | S | 12/1996 | Bergersen | |
| 5,915,672 | A * | 6/1999 | Dickey | B66F 3/24 254/133 R |
| D442,387 | S | 5/2001 | Jeghers | |
| 6,666,282 | B2 | 12/2003 | Merrick | |
| D523,041 | S | 6/2006 | Wise | |
| D594,042 | S | 6/2009 | Wise | |

(Continued)

FOREIGN PATENT DOCUMENTS

WO 2010025353 3/2010

OTHER PUBLICATIONS

Bram Dedobbeleer, Hydraulic hammers, Linkedin.com, URL: (https://www.linkedin.com/posts/bram-dedobbeleer-09856a93_cat-caterpillar-hammer-activity-7099821536378765312-pZbJ?trk=publicprofile_like_view) (Year:2023).

(Continued)

*Primary Examiner* — Lee D Wilson
(74) *Attorney, Agent, or Firm* — Harris Beach Murtha Cullina PLLC

(57) ABSTRACT

A hydraulic tool storage device positions a hydraulic tool in a manner that prevents damage to seals contained within the tool. The storage device can take the form of a tool stand that provides ready access to the hydraulic tool for mating with equipment that may utilize the tool and provides a stable platform for storage or transport of the hydraulic tool. As an example, such hydraulic tools can include hydraulic hammers.

20 Claims, 10 Drawing Sheets

(56) References Cited

U.S. PATENT DOCUMENTS

| | | | | |
|---|---|---|---|---|
| 8,181,936 | B2 * | 5/2012 | Walton | F16M 11/20 248/152 |
| 8,201,807 | B2 * | 6/2012 | Hernandez, Jr. | B66F 3/24 254/133 R |
| 8,398,056 | B1 * | 3/2013 | Morrison | B66F 3/00 254/133 R |
| 8,579,320 | B2 | 11/2013 | Chiu | |
| D701,545 | S | 3/2014 | Elder et al. | |
| 9,022,355 | B1 * | 5/2015 | Pigeon | B66F 5/04 254/2 B |
| D798,126 | S | 9/2017 | Ursell et al. | |
| D830,433 | S | 10/2018 | Ursell et al. | |
| 10,543,592 | B2 | 1/2020 | Esposito | |
| D899,629 | S | 10/2020 | Hanlon | |
| D927,928 | S | 8/2021 | Dahle et al. | |
| 2003/0047332 | A1 | 3/2003 | Merrick | |
| 2012/0181407 | A1 * | 7/2012 | Nemish | B60C 25/00 248/157 |
| 2013/0175791 | A1 | 7/2013 | Chiu | |
| 2019/0063036 | A1 | 2/2019 | Kuriger | |
| 2019/0152038 | A1 | 5/2019 | Bookwala et al. | |
| 2024/0131681 | A1 | 4/2024 | Earle et al. | |
| 2024/0240431 | A1 | 7/2024 | Moore et al. | |

OTHER PUBLICATIONS

McDowell (date retrieved Sep. 4, 2024), Rammer S26, Bmcdowell.com, URL: (https://www.bmcdowell.com/mcdowell-parts-division-hammers/2000-rammer-s26-416-426b-c-ack17-003) (Year: 2024).

Milton CAT (date published Oct. 19, 2023), Milton CAT Hammer Stands, Youtube.com, URL: (https://www.youtube.com/watch?v=wHjApasRwJw), (Year: 2023).

International Search Report and Written Opinion dated Jan. 2, 2024 issued in International Application No. PCT/US2023/033665.

* cited by examiner

HYDRAULIC TOOL STAND

CROSS REFERENCE TO RELATED APPLICATIONS

The present application is a continuation-in-part of United States Design application Ser. No. 29/857,412 filed Oct. 21, 2022, entitled Hammer Stand, the contents of which are incorporated herein in their entirety.

FIELD OF INTEREST

Inventive concepts relate to large tools and, in particular, to a method and apparatus for storing large tools, such as large hydraulic tools.

BACKGROUND

Hydraulic tools, which may be operated with heavy equipment, are employed in a vast array of applications in, for example, the construction, mining, and farming industries. It is vitally important to ensure that the hydraulic tools are not damaged by the loss or displacement of fluids and subsequent drying-out and damage to hydraulic components. The seals of an improperly stored hydraulic tool, one stored horizontally for example, may dry out, warp, and fail. If a tool with damaged seals is then put into use, hydraulic fluid may escape, causing catastrophic damage for the tool and/or associated equipment and undermining the performance of the hammer. As of this writing, some hydraulic tools, such as hydraulic hammer-breakers, or, simply, hydraulic hammers, may cost $100,000 or more and a system and method for their proper storage and transportation would maintain both the value of the hydraulic tool and the integrity of the environment.

SUMMARY

In example embodiments, in accordance with principles of inventive concepts, a hydraulic tool storage device may include a base, a vertical support, and a top collar. The base may be of sufficient area to prevent tipping of the tool when the tool is positioned within the stand. The vertical support connects the base and top collar and at least partially encloses the hydraulic tool. The top collar at least partially encloses the tool and may include a clamping assembly to hold the tool in a preferred position.

In example embodiments, the base may be configured and arranged to support, at least partially, the mass of an associated hydraulic tool, to prevent tipping while the tool is loaded, stored, or transported, and to endure the typically challenging environment in which the tool employed. To that end, the base may be constructed of a solid metal plate, a structural framework, or a combination thereof. In example embodiments, the base includes rectangular mild-steel tubes connected, by welding for example, to form a framework. Parallel rectangular tubes form end pieces that are connected by parallel rectangular mild steel tube crosspieces. A pair of plates are attached to the set of parallel crosspieces, thereby forming a rectangular box upon which a hydraulic tool may be supported. The plates may, in example embodiments, include a structure configured to engage a portion, one end for example, of an associated hydraulic tool. Such an engaging structure may be a vertical tubular structure with an opening or concavity at the top configured to receive the working end, or hammer end (that is, the end associated with the tool shaft, bit, breaker, or chisel, of the hammer), of a hydraulic hammer, for example. The upper portion of the hydraulic tool may be held in place by a top collar that may, in turn, include a clamping assembly that opens to admit the hydraulic tool for insertion or removal, allowing such insertion or removal without lifting the hydraulic tool above the level of the top collar.

In accordance with aspects of the inventive concepts, a tool stand comprises a rigid base, a support structure that extends from the base and defines a central void to receive a hydraulic tool; and a collar defining a collar opening configured to receive and maintain the hydraulic tool in a predetermined position.

In various embodiments, the hydraulic tool is a hydraulic hammer.

In various embodiments, the base has a length of between 70 and 90 inches.

In various embodiments, the base has a width of between 60 and 80 inches.

In various embodiments, the base is larger in length and width than the support structure.

In various embodiments, the stand is configured to receive and hold a hydraulic tool of at least about 500 pounds.

In various embodiments, the stand is configured to receive and hold a hydraulic tool of at least about 2,000 pounds.

In various embodiments, the tool stand further comprises a main pin extending from the base into the central void and configured to engage a distal end of the hydraulic tool.

In various embodiments, the tool stand further comprise a chisel holder configured to hold one or more chisels.

In various embodiments, the predetermined position is an upright position.

In various embodiments, the tool stand further comprise a clamping assembly having at least one clamp configured to tighten to secure the hydraulic tool in the predetermined position.

In various embodiments, the clamping assembly is configured to open to receive the hydraulic tool and to close to secure the hydraulic tool in the predetermined position within the tool stand.

In various embodiments, the tool stand further comprise an adapter plate configured to adjust the collar opening to enable the tool stand to receive and maintain different size hydraulic tools.

In various embodiments, the adapter plate removably secures to the collar.

In various embodiments, the tool stand further comprise at least one positioning mechanism formed to enable positioning the tool stand, at least one positioning mechanism chosen from the group consisting of: lifting loops, lifting points, lifting rings, and/or lifting eyes.

In various embodiments, the tool stand further comprise a pair of fork pockets configured for engagement by a pair of tines from a forklift and/or pallet truck.

In accordance with another aspect of the inventive concepts, provided is a tool stand, comprising: a rigid base; a support structure that extends from the base and defines a central void to receive a hydraulic hammer; a main pin extending from the base into the central void and configured to engage a distal end of the hydraulic hammer; and a collar defining a collar opening configured to receive and maintain the hydraulic hammer in an upright position, wherein the base is larger in length and width than the support structure.

In various embodiments, the stand is configured to receive and hold a hydraulic hammer of at least about 500 pounds.

In various embodiments, the tool stand further comprises a clamping assembly having at least one clamp configured to tighten to secure a received hydraulic tool in the upright position, wherein the clamping assembly is configured to open to receive the hydraulic tool and to close to secure the hydraulic tool in the predetermined position within the tool stand.

In various embodiments, the tool stand further comprises an adapter plate configured to adjust the collar opening to enable the tool stand to receive and maintain different size hydraulic tools.

In various embodiments, the tool stand further comprises at least one positioning mechanism formed to enable positioning the tool stand, the at least one positioning mechanism chosen from the group consisting of: a pair of fork pockets, lifting loops, lifting points, lifting rings, and/or lifting eyes.

In accordance with another aspect of the inventive concepts, provided is a method of storing a hydraulic tool that includes providing a hydraulic tool stand, comprising a base configured to at least partially support a hydraulic tool and a vertical structure, wherein the vertical structure positions a hydraulic tool for storage and transport, preparing the tool for storage; and positioning the tool within the stand in a storage orientation.

In various embodiments of the method, the hydraulic tool is a hydraulic hammer.

In various embodiments of the method, the stand includes inclinometers that indicate to an operator whether the stand is being positioned within a safe tilt range. In example embodiments the stand/tool combination may be safely displaced from the vertical by up to ±5 degrees and the inclinometers provide feedback to an operator, which may be audio and/or visual, to indicate whether stand/tool combination is positioned within a safe tilt range. In example embodiments the feedback may be in the form of a visual green indication when the stand/tool is within a safe tilt range and a visual red indication when the tool/stand is within an unsafe tilt range. In example embodiments the "safe" tilt zone may be defined as half the tipping pitch/slope (10 degrees in example embodiments).

In various embodiments of the method, the tool stand includes a collar supported by the vertical structure and open on one side to permit entry of a tool; and a clamping assembly configured to open for admission of a hydraulic tool and to close in order to secure the hydraulic tool within the tool stand; and storing the tool includes opening the collar for insertion of the tool and closing the collar for securing the tool after the tool is inserted into the stand.

In various embodiments, the method includes removing a chisel of a hydraulic hammer prior to placing the hydraulic hammer in the tool stand; including a pin on the base of the tool stand; placing the pin within an opening left by the removal of the chisel, at the hammer-end of the hydraulic hammer.

In various embodiments, the method includes employing positioning mechanisms on the tool stand to position the tool stand.

In various embodiments, the method includes positioning employing fork pockets.

In various embodiments, the method includes providing a clamping assembly on the tool stand and clamping the hydraulic hammer in place after placing the hammer in the tool stand.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION OF PREFERRED EMBODIMENTS

Figure 1:
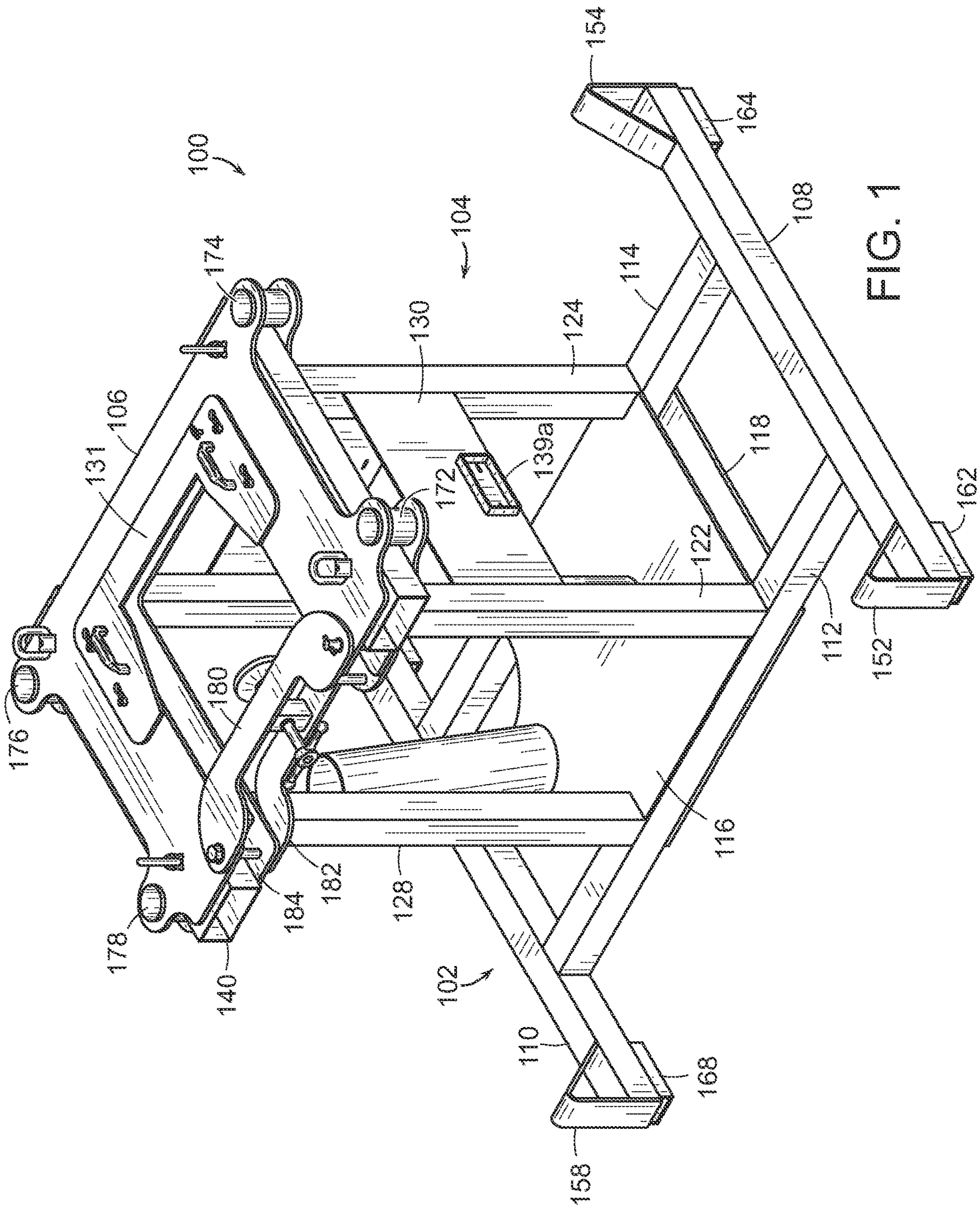
FIG. 1 is a perspective view of an embodiment of a hydraulic tool stand, in accordance with principles of the inventive concepts.

Various aspects of the inventive concepts will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items. The term "or" is not used in an exclusive or sense, but in an inclusive or sense.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing.

Although methods and apparatuses in accordance with principles of inventive concepts may be employed in conjunction with any of a variety of hydraulic tools or other types of large tools, for clarity and brevity of description, example embodiments herein will be described in the context of hydraulic tools referred to as a hydraulic hammer breaker, or, more simply, as a hydraulic hammer or hammer. And within this context, a tool stand for holding such large tools may be referred to herein as a hydraulic tool stand, a tool stand, a hammer stand or, simply, a stand.

In example embodiments, a large tool stand may include a base, a vertical support, and a support top. The base may be of sufficient area, rigidity, and strength to prevent tipping of the tool and stand when the tool is received and maintained within the stand. The vertical support connects the base and the support top and at least partially encloses the tool. The support top can comprise a top collar that at least partially encloses the tool and may include a clamping assembly to hold the tool in a preferred position within the stand, such as an upright position. In combination, the clamping assembly and top collar may completely or substantially surround the tool received within the stand. In example embodiments a tool stand in accordance with principles of inventive concepts may store a tool, such as a hydraulic hammer, in a vertical orientation safely and facilitate the movement of the tool with relative ease. In example embodiments inclinometers may provide an indication to operators of whether the stand and tool are positioned within a safe tilt range. A locking mechanism holds a hammer in place, preventing unwanted movement of the hammer within the stand, whether the stand is stationary or moving. The locking mechanism, also referred to herein as a clamping assembly, opens to allow easy entry of a hammer that is to be stored. With the locking mechanism open, the hammer need not be lifted the full height of the stand to insert or remove the hammer, thereby furthering the safe operation of storage and retrieval of the hammer. In example embodiments, the chisel (also referred to herein as a breaker, or a bit) may be removed from the hammer for storage, with a separate chisel holder provided for storage of the chisel. Removing the chisel and storing it separately allows the hammer itself to be stored in a manner in which the center of gravity of the hammer/stand combination is lowered, thereby further enhancing the safety of the stand. In some example embodiments fork pockets may be positioned relatively high on the stand, near the center of gravity of the stand/hammer combination, to further enhance the safe operation of the stand, particularly while moving the stand.

As an example, the base may be configured and arranged to support the mass of a large hydraulic tool, and to prevent tipping while the tool is loaded, stored, or transported in the stand. The base is also structured to endure the typically challenging environment in which such tools are often employed. To that end, the base may be constructed of a structural framework that supports a base support surface having at least one metal plate.

The stand may be configured to receive and hold large tools of different sizes. In example embodiments, the stand may be employed to store a plurality of different hydraulic hammers, such as an H160 and H180 hydraulic hammers manufactured by Caterpillar, Inc., or similar hydraulic hammers or tools. To that end, in various embodiments, the stand may include one or more adapters that enable the stand to be configured to receive and hold tools of different sizes and/or weights, such as hydraulic hammers H110 S, H115 S, H120 S, H130 S, H140 S, H160 S, H180 S, H190 S, and H215 S by Caterpillar Inc., and equivalents thereof. The chisel of such hydraulic hammers can have a length of about 30 inches or more and, with the chisel or tip removed, the center of gravity of the stand/tool combination may be greatly reduced, thereby enhancing safety.

FIGS. 1 through 13 show various views of an embodiment of a tool stand in the form of a hydraulic tool stand 100, which can receive and maintain a hydraulic hammer, as an example. In this embodiment, the stand 100 can include an adapter plate 131 that allows the stand to accommodate different size hydraulic hammers, e.g., a smaller H160 hydraulic hammer or a larger H180 hydraulic hammer. In other embodiments, different structural features could be provided to enable the stand to receive and maintain different size hydraulic tools or other types of large tools.

Figure 2:
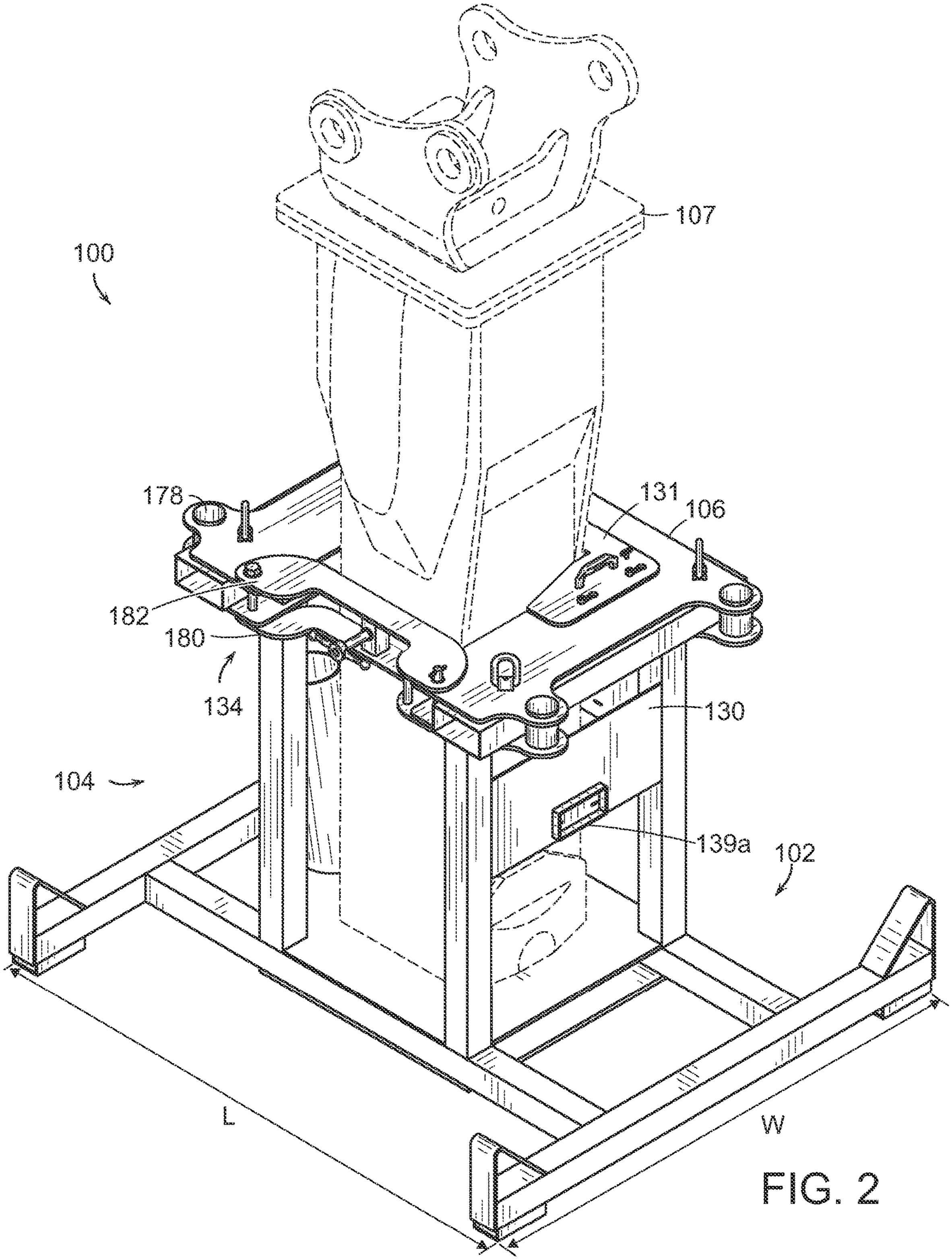
FIG. 2 is a perspective view of an embodiment of a hydraulic tool stand including a hydraulic tool supported within the stand, in accordance with principles of the inventive concepts.
Figure 3:
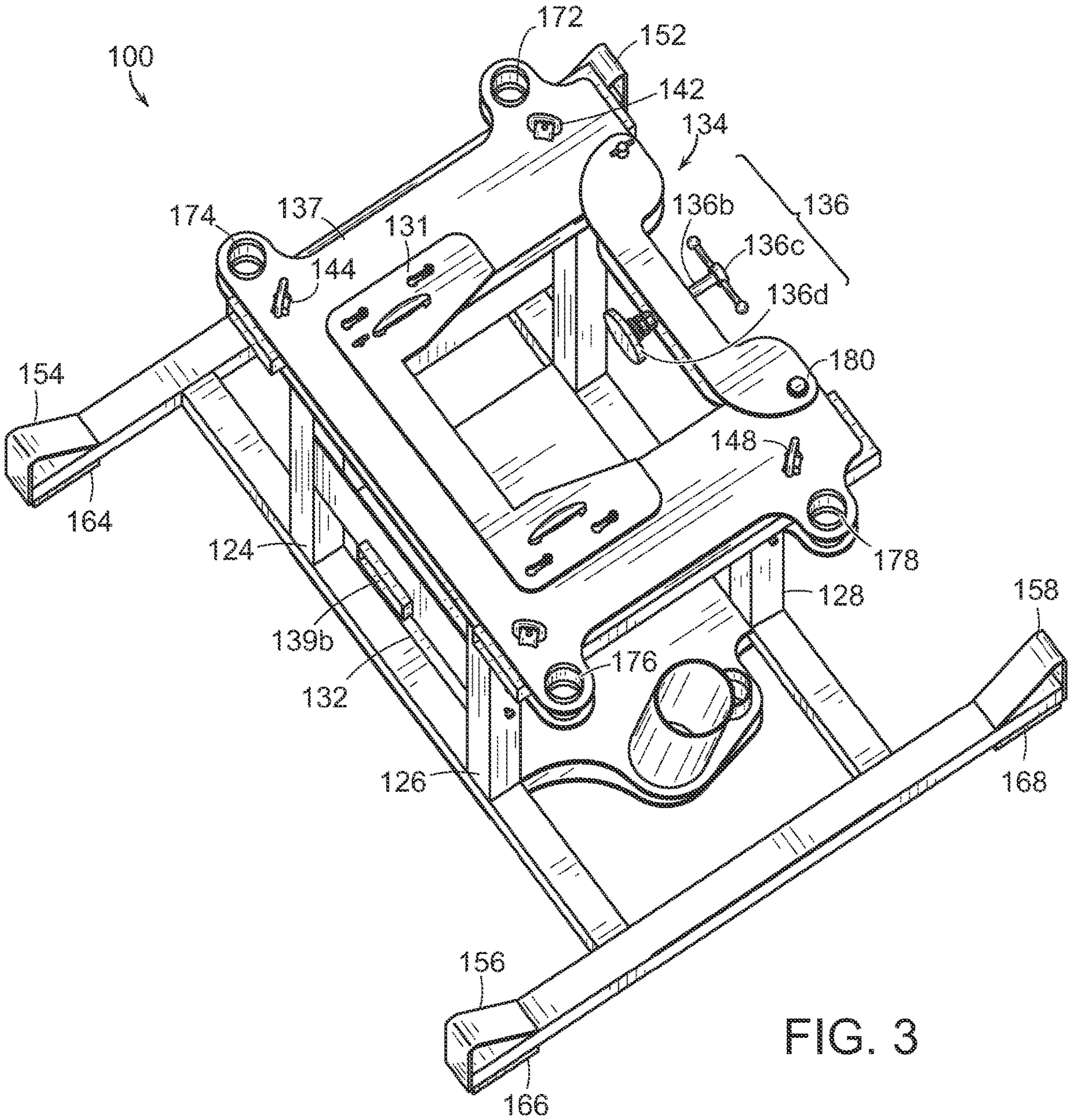
FIG. 3 is a top perspective view of an embodiment of a hydraulic tool stand, in accordance with principles of the inventive concepts.
Figure 4:
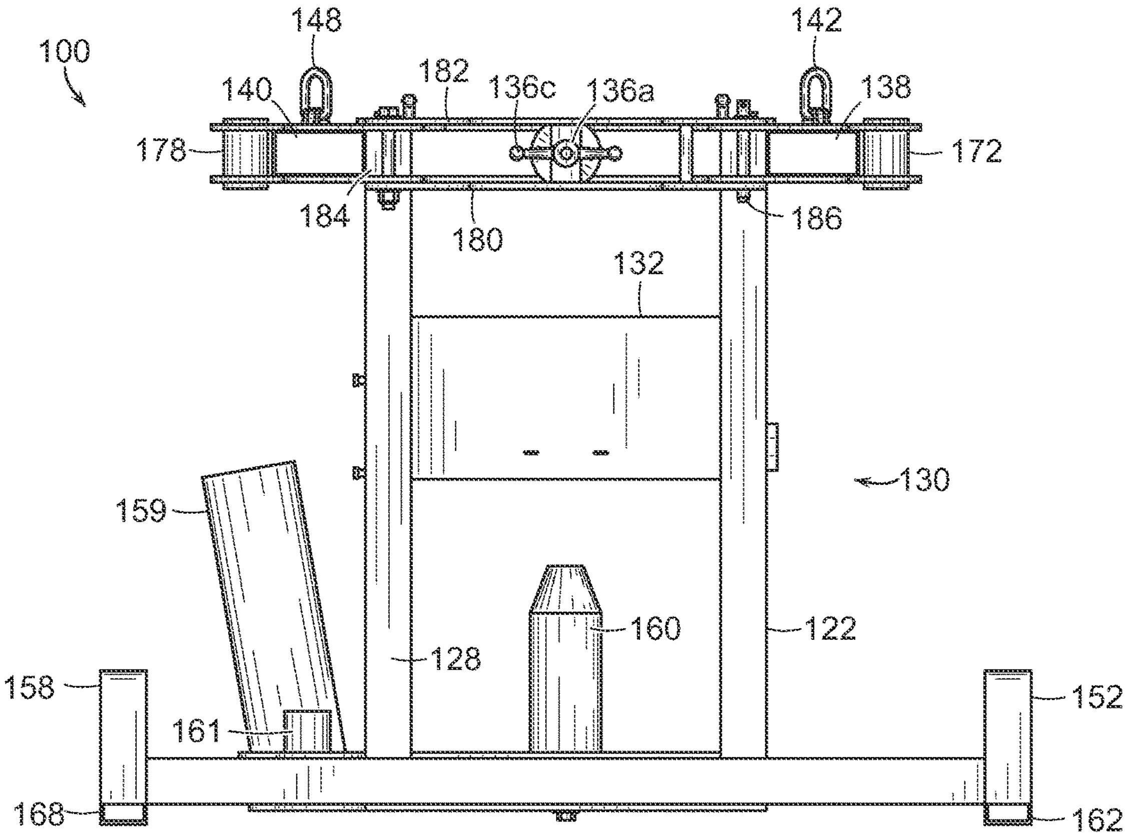
FIG. 4 is a front view of an embodiment of a hydraulic tool stand, in accordance with principles of the inventive concepts.
Figure 5:
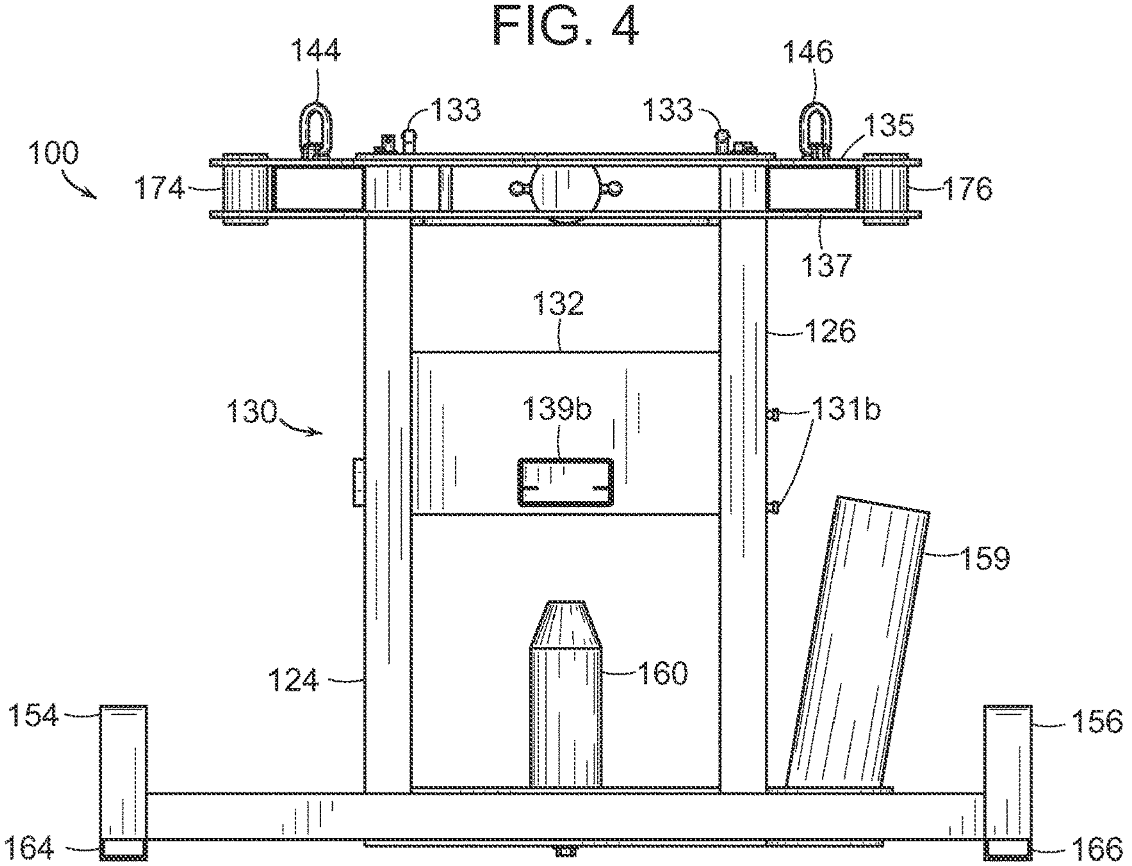
FIG. 5 is a rear view of an embodiment of a hydraulic tool stand, in accordance with principles of the inventive concepts.
Figure 6:
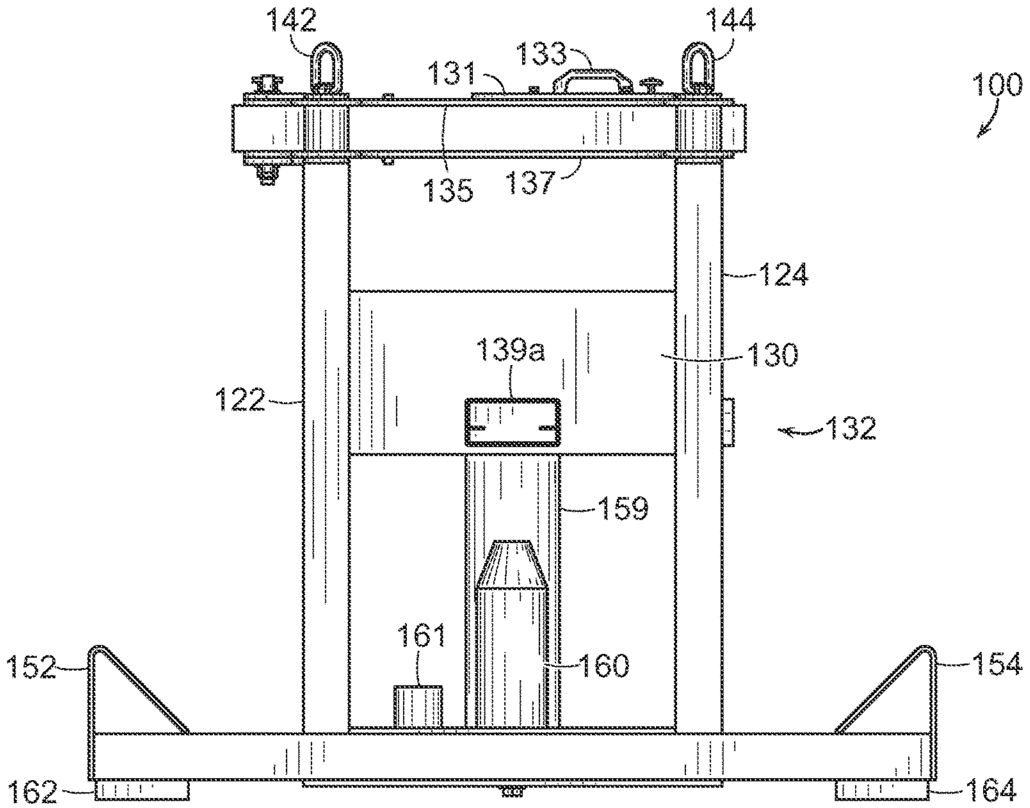
FIG. 6 is a right side view of an embodiment of a hydraulic tool stand, in accordance with principles of the inventive concepts.
Figure 7:
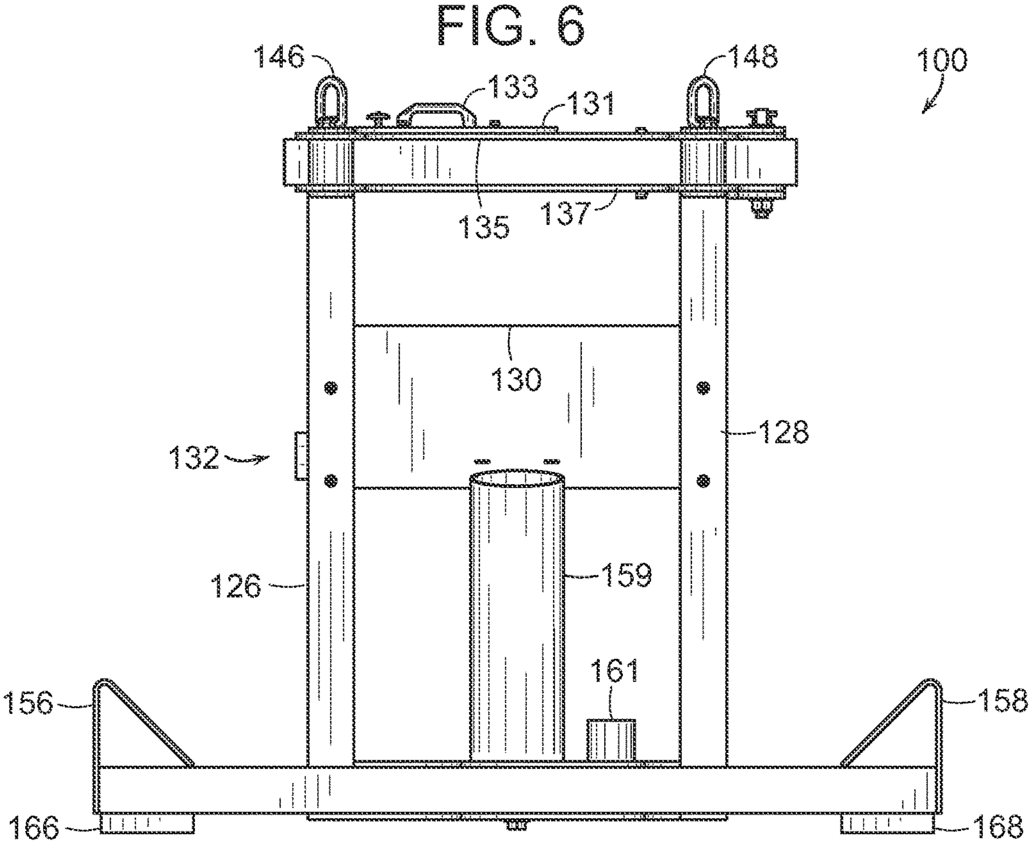
FIG. 7 is a left side view of an embodiment of a hydraulic tool stand, in accordance with principles of the inventive concepts.
Figure 8:
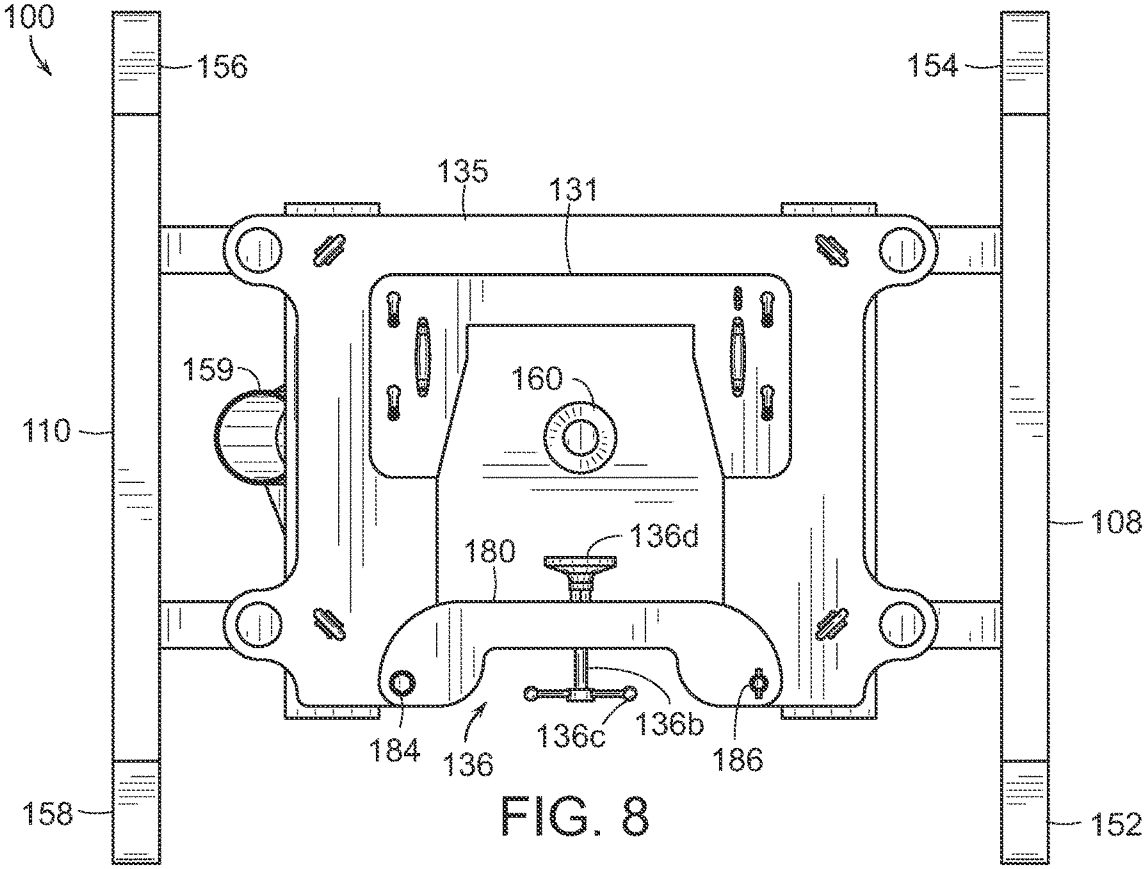
FIG. 8 is a top view of an embodiment of a hydraulic tool stand, in accordance with principles of the inventive concepts.
Figure 9:
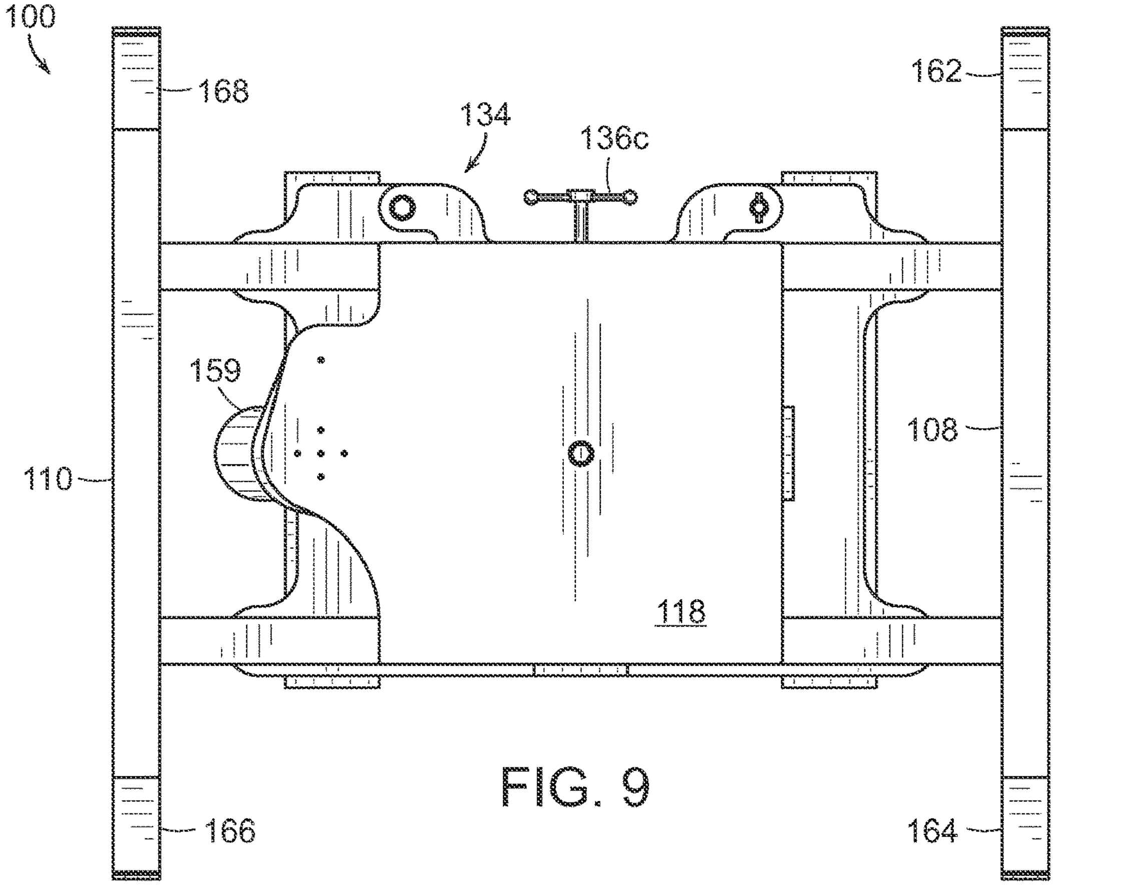
FIG. 9 is a bottom view of an embodiment of a hydraulic tool stand, in accordance with principles of the inventive concepts.
Figure 10:
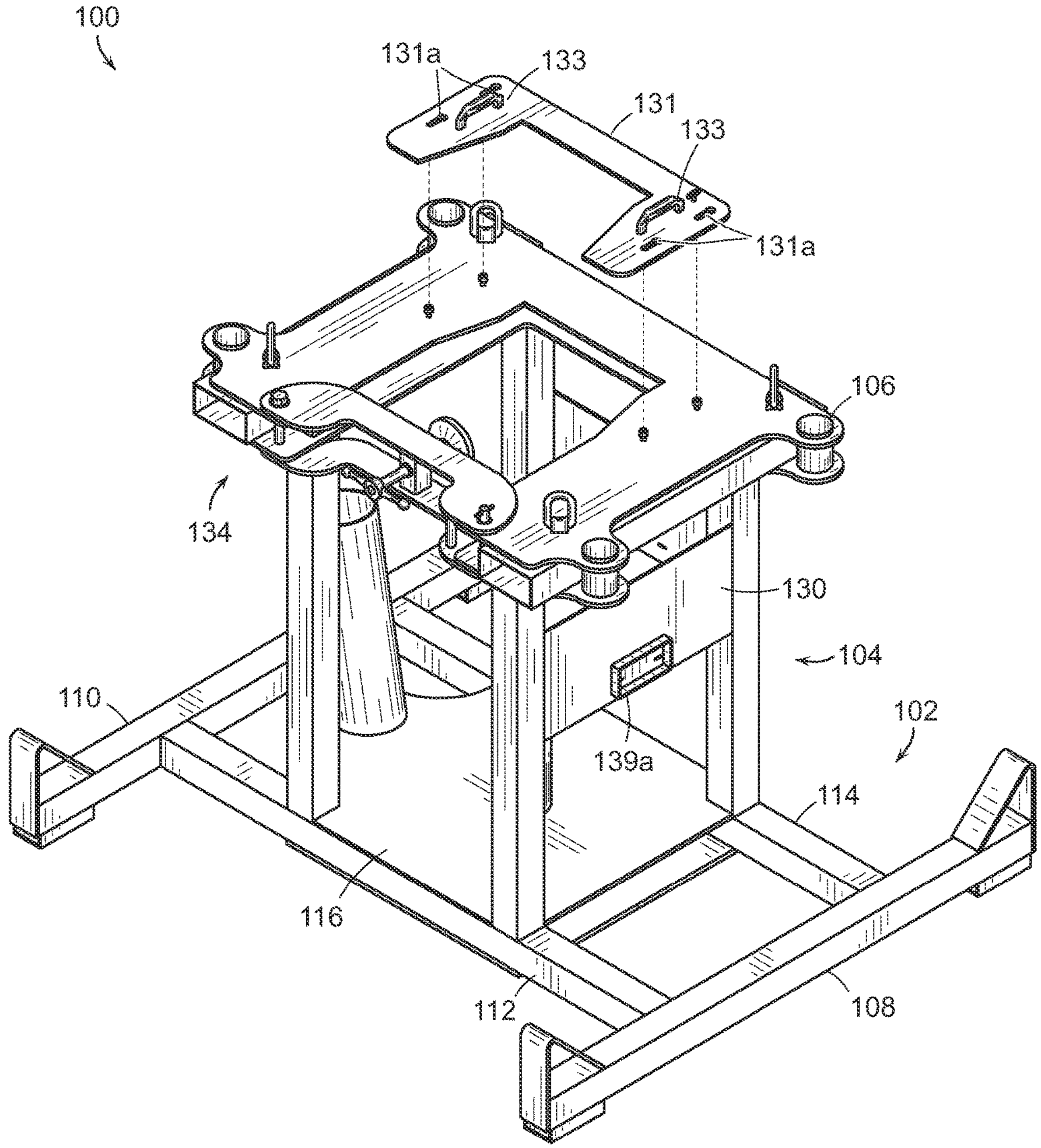
FIG. 10 is another perspective view of an embodiment of a hydraulic tool stand with an adapter plate removed, in accordance with principles of the inventive concepts.
Figure 11:
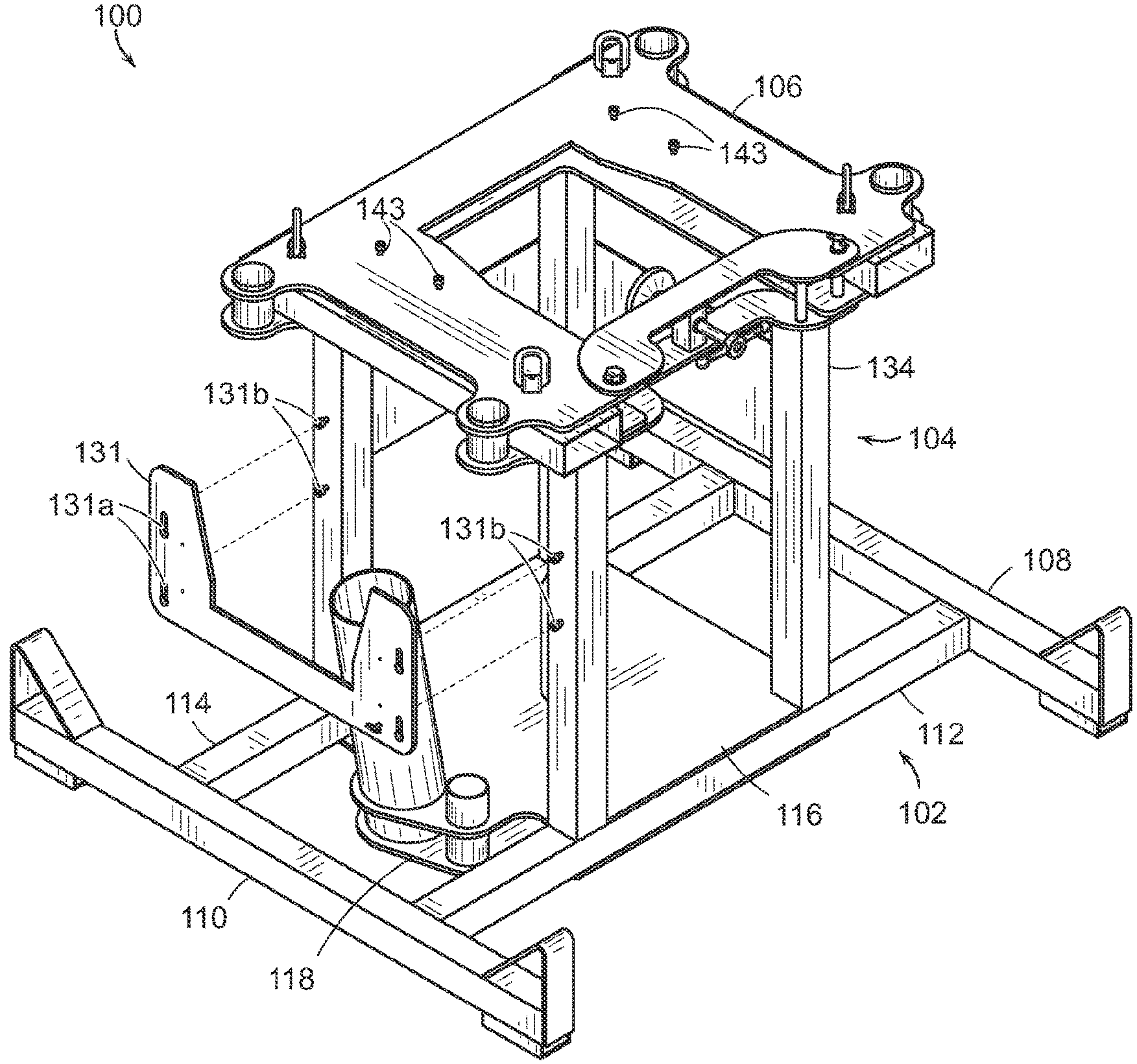
FIG. 11 is another perspective view of an embodiment of a hydraulic tool stand with an adapter plate removed, in accordance with principles of the inventive concepts.
Figure 12:
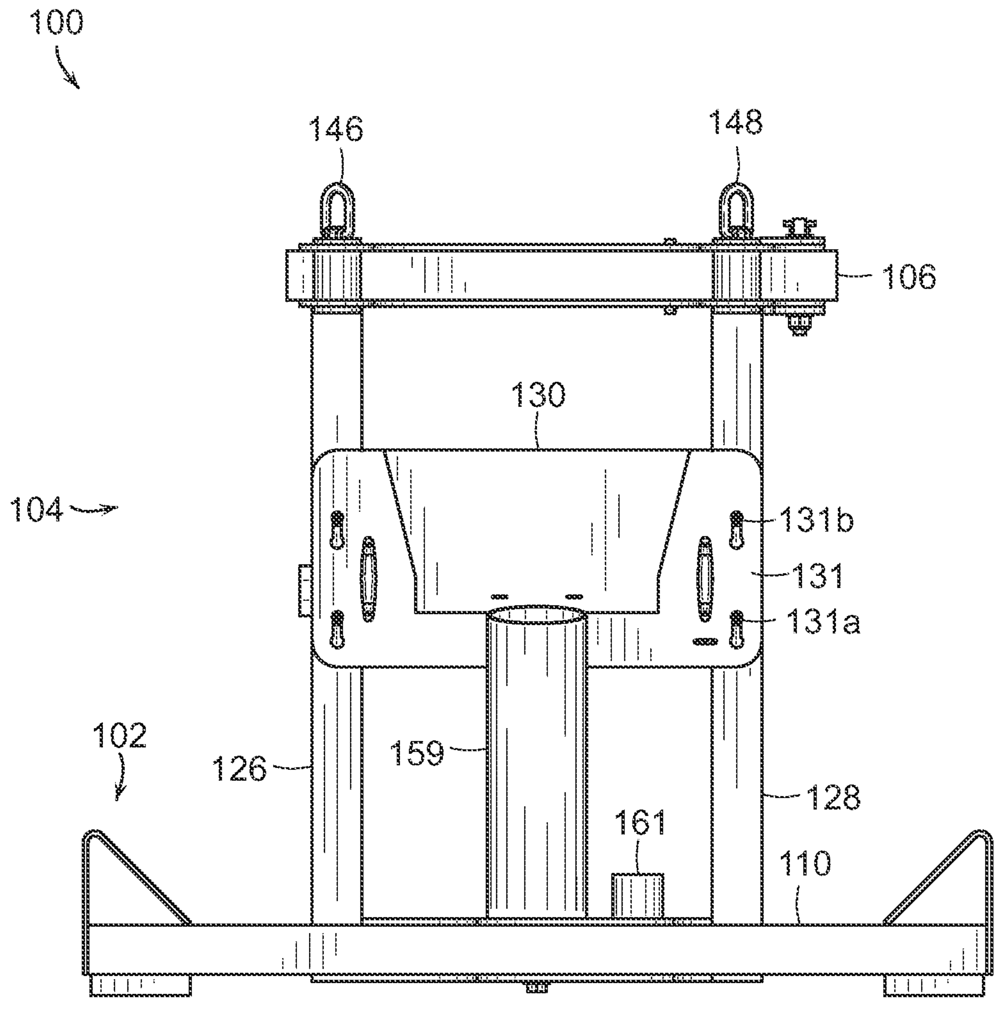
FIG. 12 is a side view of an embodiment of a hydraulic tool stand with a stowed adapter plate, in accordance with principles of the inventive concepts.
Figure 13:
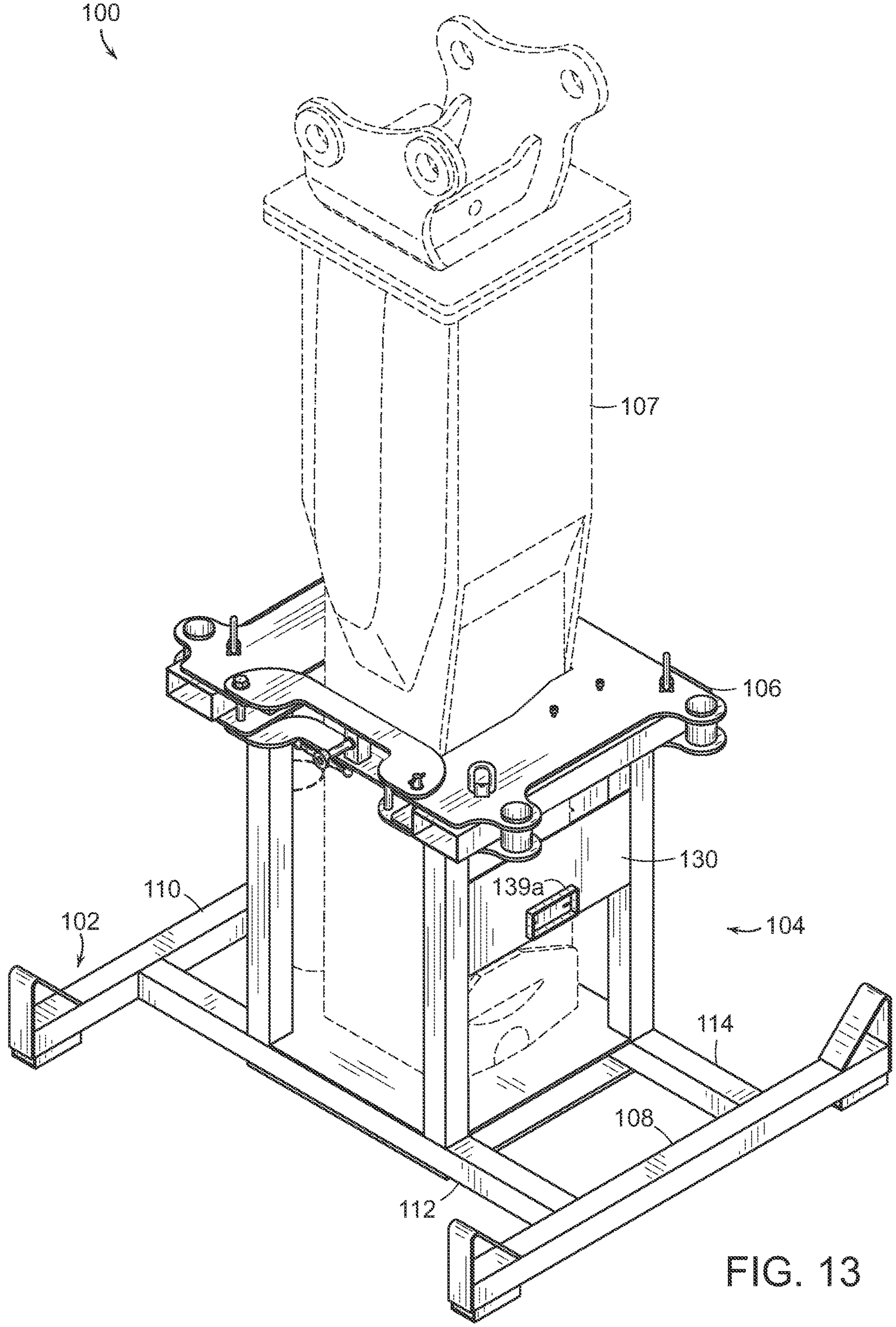
FIG. 13 is another perspective view of an embodiment of a hydraulic tool stand with an adapter plate removed and a large hydraulic tool therein, in accordance with principles of the inventive concepts.

Referring to the figures, FIG. 1 is a perspective view of an embodiment of the hydraulic tool stand; FIG. 2 is a perspective view of the hydraulic tool stand including a hydraulic tool supported within the stand; FIG. 3 is a top perspective view of the hydraulic tool stand; FIG. 4 is a front view of the hydraulic tool stand; FIG. 5 is a rear view of the hydraulic tool stand; FIG. 6 is a right side view of the hydraulic tool stand; FIG. 7 is a left side view of the hydraulic tool stand; FIG. 8 is a top view of the hydraulic tool stand; FIG. 9 is a bottom view of the hydraulic tool stand; FIG. 10 is another perspective view of the hydraulic tool stand with an adapter plate removed; FIG. 11 is another perspective view of the hydraulic tool stand with an adapter plate removed; FIG. 12 is a side view of the hydraulic tool stand with a stowed adapter plate; and FIG. 13 is another perspective view of the hydraulic tool stand with an adapter plate removed and a large hydraulic tool therein.

As shown in several figures, such as FIG. 1, the stand 100 includes a base 102, a vertical support structure 104, and a top collar 106, wherein the support structure 104 is disposed between the base 102 and the top collar 106, thereby rigidly supporting the top collar 106 above the base 102. The base 102 may circumscribe a sufficient area and provide sufficient strength to prevent tipping of a hydraulic tool maintained within the stand 100. The support structure 104, which connects the base 102 and top collar 106, is configured to at least partially surround the hydraulic tool within the stand. The top collar 106 also at least partially surrounds the tool and may include a clamping assembly 134 configured to securely hold the tool in a preferred orientation or position within the stand, such as an upright orientation or position. In combination, the top collar 106 and clamping assembly 134 can completely or substantially surround and secure the tool within the stand 100, in various embodiments. Generally, the preferred orientation of the tool within the stand will be one in which seal integrity is preserved, vertically supported by and within the stand 100.

The stand 100 and its base 102 are configured, structured, formed, and/or arranged to support the mass of an associated hydraulic tool, to prevent tipping while the tool is loaded, stored, maintained, and/or transported, and to endure the typically challenging environment in which the tool may be employed, such as unpaved construction sites. In example embodiments, an unloaded hydraulic tool stand 100 may weigh approximately 1,900 pounds. The same tool stand may weigh approximately 10,000 pounds when loaded with an H180 hammer and approximately 8,500 pounds when loaded with an H160 hammer, as examples.

Referring to FIG. 2, the prevention of tipping is therefore critical. In example embodiments, a length L of the stand 100, from outside edge of endpieces 108, 110, may be between 70 and 90 inches and a width W equal to the length of an endpiece 108, 110, may be between 60 and 80 inches. In an example embodiment, the length L is 80 inches, and the width W is 72.75 inches. The length L and width W may be selected to prevent tipping of the stand 100, particularly when the stand is loaded with a hydraulic tool such as hydraulic hammer 107. Different stands configured to hold different large tools, e.g., tools weighing several hundred pounds or more, having different weights, sizes, and centers of mass can have different dimensions. In various embodiments, the base 102 is larger in length and width than the support structure 104.

In the embodiment of FIGS. 1-13, the base 102 includes rectangular tubes connected by welding to form a framework. In example embodiments, the rectangular tubes are formed of ¼" A36 mild steel and have an 8" by 4" cross-section. Mild steel is a type of low-carbon steel known in the art. In other embodiments, other types and/or shapes of steel, metal, or material could be used to form the base 102.

More specifically, in the figures the base 102 includes rectangular mild steel tubes 108, 110, 112, 114 connected, by welding, for example, to form a framework. The base 102 may also include at least one solid metal plate secured to the framework formed by the tubes 108, 110, 112, 114. In this embodiment, the base includes a top plate 116 and a bottom plate 118 in parallel. In example embodiments, parallel rectangular tubes 108, 110 form endpieces that are connected by parallel rectangular tube crosspieces 112, 114. Top and bottom base plates 116, 118 are attached to the crosspieces 112, 114, thereby forming a box structure open on two ends and closed by the crosspieces 112, 114 on either side.

The base 102 may, in some embodiments, include an engagement structure configured to engage a portion, e.g., one end, of an associated hydraulic tool 107 (e.g., see FIGS. 2 and 13) that is to be supported and/or maintained by the stand 100. Such an engagement structure may take the form of a main pin 160 configured to receive a working end, or hammer end (that is, the end associated with the tool shaft, or chisel, of the hammer), of a hydraulic hammer, for example. The main pin 160 may take the form of a protrusion that extends upwardly from the base 102 and/or its top plate 116 into an internal or central void within the support structure 104 that receives the tool within the stand. In some embodiments, the main pin 160 may take the form of a vertical cylindrical or tubular structure having a tapered or conical end that is configured to receive the working end, or hammer end, of the hydraulic hammer, for example. In various embodiments, the chisel (that is the tip, tool shaft, tool bit, or cylinder that makes hammering contact with a workpiece during use) is removed before storing the hammer in the stand 100 and the main pin 160 acts to guide and position the end of the hydraulic hammer into a preferred position within the stand 100.

Loops 152, 154, 156, 158 may be formed on the base 102 at the extremes of the endpieces 108, 110, see, for example, FIGS. 1, 3 and 6-8. Loops 152, 154, 156, 158 are provided in example embodiments to prevent a fork truck from driving onto the frame of the stand 100 while engaging fork pockets 138, 140.

The base 102 may include pads 162, 164, 166, 168 to elevate the tool stand 100 from a surface upon which it rests to provide clearance, for example, for a retaining bolt that holds main pin 160 in place. The pads 162, 164, 166, 168 may be located at ends of the endpieces 108, 110 and their total area may be such that a loaded stand may rest on a surface, such as paved asphalt, without damaging the surface. In some embodiments, the pads 162, 164, 166, 168 may be located under the loops 152, 154, 156, 158, respectively.

Referring to FIGS. 4-7, as examples, stand 100 may include, for the convenience of an operator, a chisel holder 159 The stand may also include a manual holder 161 that may be used to hold a hydraulic tool stand manual or other relevant documents. The chisel holder 159 and/or the manual holder 161 may extend from the base 102, in various embodiments. For ease of access, the chisel holder, which can take the form an elongate tube, can extend at an angle away from the support structure 104. Both the chisel holder 159 and the manual holder 161 may include drainage holes at the bottom (not shown) to drain any environmental liquids, such as rain, for example. In other embodiments, the chisel holder 159 and/or the manual holder 161 may be omitted or otherwise located on the stand 100.

In the embodiment of FIGS. 1, 6, and 7, as examples, the support structure 104 may include four rectangular tube posts 122, 124, 126, 128 attached, by welding for example, to the base 102. In the embodiment shown, the four vertical posts 122, 124, 26, 128 are vertically affixed to the horizontally oriented parallel crosspieces 112, 114 that join the endpieces 108, 110 of the base 102. In the figures, post 112 is a right, front post; post 112 is right, rear post; post 126 is left, rear post; and post 128 is a left, front post.

In various embodiments, the support structure 104 may include one or more cross members. As shown in FIGS. 1, 2, 5, 6, 10, and 13, as examples. In some embodiments, one or more cross members may take the form of plates 130, 132 affixed to one or more of the vertical posts 122, 124, 126, 128 to form one or more partially closed sides. In example embodiments, cross members 130, 132 may be employed as surfaces to display use and/or safety information associated with the stand 100, such as use instructions and/or safety warnings, and other such information.

In some embodiments, structural cross members may be added to strengthen and stabilize the vertical posts, for example they may be affixed to one or more of the vertical posts 122, 124, 126, 128 and/or portions of the base 102 and/or portions of the collar 106. In various embodiments the plates 130, 132 may serve to provide greater structural stability to the support structure 104. In some example embodiments stand 100 may inclinometers positioned perpendicular to one another (i.e., north/south, east/west) to avoid positioning of the stand 100 with an excessive tilt angle. In example embodiments inclinometers 139*a*, 139*b* may be included on plates 130, 132, which are perpendicular to one another and thereby provide the requisite "north/south," "east/west" tilt orientations. In example embodiments inclinometers 139*a*, 139*b* may be guarded with, for example, a steel frame to prevent damage.

Referring again to FIGS. 1-13, in this embodiment, a support top that defines an upper portion of the stand 100 takes the form of or includes the top collar 106 in combination with a clamping assembly 134. In some embodiments, the collar 106 may be formed of two generally u-shaped plates 135, 137 arranged in parallel and spaced apart, with an upper plate 135 above a lower plate 137. The collar 106 defines a collar opening, arranged above a central void formed by the support structure, to receive and maintain a received hydraulic tool. The collar 106 is supported by the vertical posts 122, 124, 126, 128 of the support structure 104. In this embodiment, the collar 106 is generally u-shaped, to receive the hydraulic tool 107, with an open side allowing for easy insertion of the hydraulic tool in the collar opening (see FIGS. 2 and 13). The clamping assembly 134, which, in example embodiments, attaches to the u-shaped collar 106, operates to close the collar opening in the u-shaped collar 106 to secure the tool 107 after its positioning within the stand 100, see, for example, FIGS. 1, 2 and 13.

In various embodiments, as shown, for example, in FIGS. 4 and 8, the clamping assembly 134 can include one or more clamps 136 or other securing mechanisms, which, when tightened, further restrict movement and secure a hydraulic tool 107 positioned within the stand 100. A clamp 136 may include a holder 136*a* that defines a threaded opening. The clamp 136 may further include a threaded shaft 136*b* configured to travel within the threaded opening of the holder 136*a*. A first end of the shaft 136*b* can have a handle 136*c* and an opposite end can have an engager 136*d* configured to engage the tool 107. When tightened via the handle 136*c*, the threaded shaft 136*b* travels through the threaded opening so that the engager 136*d* applies pressure to the tool 107 within the stand 100. Conversely, when loosened via the handle 136*c*, the threaded shaft 136*b* travels in the opposite direction to release pressure by the engager 136*d* from the hydraulic tool 107 within the stand 100. In other embodiments, the clamp could take other forms.

In the embodiment shown, the clamping assembly 134 may include parallel upper 182 and lower 180 clamp arms, between which the clamp 136 can be disposed. In other embodiments, the clamping assembly 134 can include more or less plates to form an arm and the clamp 136 could be differently attached to the clamping assembly 134.

The clamping assembly 134 can include one or more pins, such as pins 184 and 186, configured to attach and secure the clamping assembly 134 to the u-shaped collar 106. In example embodiments, pin 184 may be a hinge pin that couples the clamping assembly 134 to the collar 106 and the other pin may be a quick release pin 186 that locks the clamping assembly closed. The hinge pin 184 allows an operator to rotate the clamping assembly 134 out of the way so the hydraulic hammer 107 can be positioned within the stand 100 and allows the clamping assembly 134 to quickly rotate to close the opening in the collar 106 when the hydraulic hammer is positioned within the stand 100. Once closed, the locking pin 186 can be inserted to lock the clamping assembly closed. Then the clamp 136 can be tightened to secure the hammer 107 within the stand 100. In the embodiment of FIGS. 1-13, the collar 106, e.g., the upper and lower plates of the top collar, includes at least one hole to receive the removable lock pin 186.

Referring to various figures, in various embodiments, lifting points, rings, or eyes 142, 144, 146, 148 may be affixed to or formed in the collar 106 for use in lifting and positioning the stand 100. In some embodiments, the lifting eyes 142, 144, 146, 148 can be bolted or otherwise coupled to the top collar 106, e.g., bolted or otherwise coupled to the upper plate 135 and/or the lower plate of the top collar 106. In some embodiments, the lifting points, rings, or eyes 142, 144, 146, 148 can take the form of D-rings bolted to the collar 106.

In some embodiments, fork pockets 138, 140 may be included within or proximate to the collar 106 to receive tines of a forklift and/or pallet truck, which may be used to load or unload the stand 100 and associated hydraulic hammer, if there is one within the stand, for transport. In various embodiments, the fork pockets 138, 140 can take the form of tubes having a rectangular cross-section that are disposed between the upper and lower plates 135, 137 of the top collar 106. In some embodiments, the fork pockets 138, 140 can be the same depth as the top collar 106. In some embodiments, the fork pockets 138, 140 can have a depth that is greater than the top collar 106. But in other embodiments, the fork pockets can have a depth than is less than a depth of the top collar 106.

Referring, for example, to FIG. 3, the collar 106 may also include a plurality of hose sleeves, such as hose sleeves 172, 174, 176, 178, which could be employed to hold hydraulic hoses of the hydraulic tool 107 and prevent them from whipping about during transport. In example embodiments, a hydraulic tool 107 may be positioned in an upright position whereby it prevents damage to the hydraulic tool and its seals. The upright orientation of the tool 107 in the stand 100, see FIGS. 2 and 13, with its engagement end exposed at or above the top of the stand, also maintains the tool in a position for mating with the excavator, backhoe, skid steering or other equipment with which the hydraulic hammer is employed.

In example embodiments, the stand 100 may be employed to store a hydraulic hammer, e.g., the H160 or H180 hydraulic hammers, when placed on a level, improved surface such as concrete, pavement or hard-packed gravel not to exceed 5 degrees in slope. In example embodiments, the stand 100 may be moved to such a surface using the four lifting points or eyes 142, 144, 146, 148 or with forklift pockets 138, 140.

To load a hammer 107 into stand 100, the stand 100 is preferably placed on a level surface, or substantially level surface (e.g., level with a pitch of less than 5 degrees), with an operator ensuring, through use of inclinometers 139*a*, 139*b*, that the slope in either direction (that is, parallel with or perpendicular to the direction of end pieces 108, 110 for example) is less than a maximal slope, 5 degrees in example embodiments.

As shown in FIGS. 1-12, the stand 100 may include a removable adapter plate 131 that may be selectively used to enable the stand 100 to hold hydraulic tools, or other large tools, of different sizes. The adapter plate 131 may have structures to removably secure it to the top collar 106 and may include a cutout configured to engage the tool 107. Owing to the cutout, the adapter plate 131 may be generally u-shaped, in various embodiments.

Depending on the size of the hydraulic tool, the adapter plate 131 may or may not be needed. If used, the adapter plate 131 is locked in position relative to the top collar 106. The clamping assembly 134 (including upper 182 and lower 180 arm plates) may be opened and the hammer lifted, e.g., by a crane, to the vertical position. The bottom (that is, hammer-end) of the hammer 107 with tool bit, or chisel, removed is placed within the stand 100 on the main pin 160. The clamping assembly 134 is then closed and the clamp 136 tightened before disconnecting the hammer from the lifting hardware (crane, for example).

In various embodiments, as examples, the adapter plate 131 may be positioned to accommodate whichever of the H160 or H180 hydraulic hammers, or other hydraulic hammers, is to be supported or held by the stand 100. As an example, FIG. 1 shows the adapter plate 131 attached to the collar 106 to receive a tool 107 of a first size. FIG. 2 shows the tool 107, e.g., the H160 hydraulic hammer, of a first size in the stand 100 with the adapter plate 131 attached to a top surface of the collar 106. In this case, the adapter plate 131 is used to reduce the size of the opening in the top of the stand formed by the u-shaped collar 106 and clamp assembly 134. The clamp assembly 134 is then useful to secure and steady the tool 107 within the stand.

FIG. 2 is a perspective view of the stand 100 supporting a small hammer 107, e.g., the H160 hydraulic hammer, where the adapter plate 131 is used. And FIG. 13 is a perspective view of the stand 100 supporting a large hammer 107, e.g., the H180 hydraulic hammer, where the adapter plate 131 is not used. When the adapter plate 131 is not used, the adapter plate can be in moved to a storage or stowed position, as shown in FIGS. 11 and 12. Therefore, in example embodiments, an adapter plate 131 is not required to hold a large hydraulic tool in the stand 100. As previously noted, various adapter plates of different dimensions may be employed to securely store hydraulic hammers or other large tools of different dimensions.

The adapter plate 131 can include at least one handle 133 to allow easy handling and positioning of the adapter plate 131 between a use position on top of the collar 106 and a stowed position on the side of the stand 100, e.g., as shown in FIGS. 10, 11, and 12. The adapter plate 131 can include two sets of keyhole openings 131*a*. Referring to FIG. 10, for example, the collar 106 can include two sets of engagement members 143 that operate to hold the adapter plate 131 in place, in this instance, in a use position atop the stand 100. Similarly, a side of the support structure 104 can include two sets of engagement members 131*b* that operate to hold the adapter plate 131 in place, in this instance, in a stowed position on a side of the stand 100. In each case, the engagement members 131*b*, 143 can be bolts having bolt heads that fit in larger openings of the keyholes 131*a* of the adapter plate 131, wherein the keyholes 131*a* can also include elongate narrower openings that are larger than a width of the shafts of the bolts, but smaller in width than the bolt heads. Such an arrangement allows the adapter plate to be slid into position on the collar 106 for use (see FIGS. 1 and 2) or slid into position on the side of the support structure for storage (see FIG. 11-13). Those skilled in the art will appreciate that the adapter plate can be optional and different types of adapters could be used in different embodiments.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

It is appreciated that certain features of the invention, which are, for clarity, described in the context of separate embodiments, may also be provide in combination in a single embodiment. Conversely, various features of the invention which are, for brevity, described in the context of a single embodiment may also be provided separately or in any suitable sub-combination.

For example, it will be appreciated that the features set out in the claims (whether independent or dependent) can combined in any given way.

What is claimed is:

1. A tool stand, comprising:

a rigid base;

a support structure that extends from the base and defines a central void to receive a hydraulic hammer;

a collar having a top surface and defining a collar opening that opens into the central void and configured to receive and maintain the hydraulic hammer in a predetermined position; and a fully removable adapter plate positioned on the top surface of the collar and configured to adjust a size of the collar opening to enable the tool stand to receive and maintain different size hydraulic tools.

2. The tool stand of claim 1, wherein the base has a length of between 70 and 90 inches.

3. The tool stand of claim 1, wherein the base has a width of between 60 and 80 inches.

4. The tool stand of claim 1, wherein the base is larger in length and width than the support structure.

5. The tool stand of claim 1, wherein the stand is configured to receive and hold a hydraulic hammer of at least about 500 pounds.

6. The tool stand of claim 1, wherein the stand is configured to receive and hold a hydraulic hammer of at least about 2,000 pounds.

7. The tool stand of claim 1, further comprising a main pin extending from the base into the central void and configured to engage a distal end of the hydraulic hammer.

8. The tool stand of claim 1, further comprising a cylindrical chisel holder configured to accommodate a chisel of the hydraulic hammer.

9. The tool stand of claim 1, wherein the predetermined position is an upright position.

10. The tool stand of claim 1, further comprising a clamping assembly having at least one clamp configured to tighten to secure the hydraulic tool in the predetermined position.

11. The tool stand of claim 10, wherein the clamping assembly is configured to open to receive the hydraulic tool within the central void and to close to secure the hydraulic tool in the predetermined position within the central void.

12. The tool stand of claim 10, wherein the adapter plate is positioned opposite the collar opening.

13. The tool stand of claim 1, wherein the adapter plate removably secures to the collar.

14. The tool stand of claim 1, further comprising at least one positioning mechanism formed to enable positioning the tool stand, the at least one positioning mechanism chosen from the group consisting of: lifting loops, lifting points, lifting rings, and/or lifting eyes.

15. The tool stand of claim 14, further comprising a pair of fork pockets positioned adjacent the top surface of the collar and configured for engagement by a pair of tines from a forklift and/or pallet truck.

16. A tool stand, comprising:

a rigid base;

a support structure that extends from the base and defines a central void to receive a hydraulic hammer;

a main pin extending from the base into the central void and configured to engage a distal end of the hydraulic hammer; and a collar defining a collar opening configured to receive and maintain the hydraulic hammer in an upright position, wherein the base is larger in length and width than the support structure.

17. The tool stand of claim 16, wherein the stand is configured to receive and hold a hydraulic hammer of at least about 500 pounds.

18. The tool stand of claim 16, further comprising a clamping assembly having at least one clamp configured to tighten to secure a received hydraulic tool in the upright position, wherein the clamping assembly is configured to open to receive the hydraulic tool and to close to secure the hydraulic tool in the predetermined position within the tool stand.

19. The tool stand of claim 16, further comprising an adapter plate configured to adjust the collar opening to enable the tool stand to receive and maintain different size hydraulic tools.

20. The tool stand of claim 16, further comprising at least one positioning mechanism formed to enable positioning the tool stand, the at least one positioning mechanism chosen from the group consisting of: a pair of fork pockets, lifting loops, lifting points, lifting rings, and lifting eyes.

* * * * *